(12) United States Patent
Imai et al.

(10) Patent No.: US 9,115,297 B2
(45) Date of Patent: Aug. 25, 2015

(54) ADHESIVE COMPOSITION

(75) Inventors: Hirofumi Imai, Kawasaki (JP); Koki Tamura, Kawasaki (JP); Atsushi Kubo, Kawasaki (JP); Takahiro Yoshioka, Kawasaki (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 151 days.

(21) Appl. No.: 13/240,415

(22) Filed: Sep. 22, 2011

(65) Prior Publication Data
US 2012/0083561 A1    Apr. 5, 2012

(30) Foreign Application Priority Data

Sep. 30, 2010 (JP) ................. 2010-220763
Jan. 13, 2011 (JP) ................. 2011-004959

(51) Int. Cl.
*C09J 123/24* (2006.01)
*C09J 123/02* (2006.01)
*C08K 5/01* (2006.01)
*C08K 5/101* (2006.01)
*C08K 5/134* (2006.01)
*C09J 123/08* (2006.01)

(52) U.S. Cl.
CPC ............. *C09J 123/0823* (2013.01); *C08K 5/01* (2013.01); *C08K 5/101* (2013.01); *C08K 5/1345* (2013.01); *C09J 123/02* (2013.01); *C09J 123/24* (2013.01)

(58) Field of Classification Search
CPC ................................................. C09J 123/0823
See application file for complete search history.

(56) References Cited

U.S. PATENT DOCUMENTS

| | | | |
|---|---|---|---|
| 3,640,977 | A | 2/1972 | Gonzenbach et al. |
| 5,059,487 | A | 10/1991 | Muro |
| 5,888,703 | A * | 3/1999 | Tomo .................... 430/315 |
| 6,255,396 | B1 * | 7/2001 | Ding et al. .............. 525/191 |
| 7,015,276 | B2 | 3/2006 | Morita et al. |
| 7,186,448 | B2 | 3/2007 | Yokoyama |
| 8,298,365 | B2 | 10/2012 | Imai et al. |
| 2004/0039122 | A1 | 2/2004 | Morita et al. |
| 2007/0185310 | A1 | 8/2007 | Moore et al. |
| 2008/0173970 | A1 | 7/2008 | Pillalamarri et al. |
| 2008/0200011 | A1 | 8/2008 | Pillalamarri et al. |
| 2008/0281037 | A1 | 11/2008 | Karjala |
| 2008/0306207 | A1 | 12/2008 | Moore et al. |
| 2009/0280318 | A1 | 11/2009 | Matsugi |
| 2010/0069593 | A1 | 3/2010 | Asai et al. |
| 2010/0086799 | A1 * | 4/2010 | Asai et al. .............. 428/532 |
| 2010/0112305 | A1 | 5/2010 | Hong et al. |
| 2010/0206479 | A1 | 8/2010 | Pillalamarri et al. |
| 2011/0086955 | A1 * | 4/2011 | Hong et al. ............. 524/133 |
| 2012/0073741 | A1 | 3/2012 | Asai et al. |
| 2012/0291938 | A1 | 11/2012 | Hong et al. |

FOREIGN PATENT DOCUMENTS

| | | |
|---|---|---|
| EP | 0995784 B1 | 9/2004 |
| JP | 50-76144 | 6/1975 |
| JP | 05-186747 | 7/1993 |
| JP | 5-279554 | 10/1993 |
| JP | 06-033027 | 2/1994 |
| JP | 07-157737 | 6/1995 |
| JP | 07-224270 | 8/1995 |
| JP | 08-092441 | 4/1996 |
| JP | 09-157628 | 6/1997 |
| JP | 11-158225 | 6/1999 |
| JP | 11-269394 A | 10/1999 |
| JP | 2000-034454 | 2/2000 |
| JP | 2000-304920 | 11/2000 |
| JP | 2000-327878 | 11/2000 |
| JP | 2001-187874 | 7/2001 |
| JP | 2001-279208 | 10/2001 |
| JP | 2003-3048 | 1/2003 |
| JP | 2003-173993 | 6/2003 |
| JP | 2005-290277 | 10/2005 |
| JP | 2008-133405 | 6/2008 |
| JP | 2008-202003 | 9/2008 |
| JP | 2008-214365 | 9/2008 |
| JP | 2008-231384 | 10/2008 |
| JP | 2009-529065 | 8/2009 |
| JP | 2010-506406 | 2/2010 |
| JP | 2010-109324 | 5/2010 |
| JP | 2011-219506 | 11/2011 |
| JP | 2012-507600 | 3/2012 |
| WO | 2008045669 A | 4/2008 |
| WO | WO 2010/143510 | 12/2010 |

OTHER PUBLICATIONS

Hawley's Condensed Chemical Dictionary, Definition of Condensation, 2002, John Wiley & Sons, Inc., 14th Edition.*
Zwenger, S. and Basu, C. Plant Terpenoids: Applications and Future Potentials. Biotechnology and Molecular Biology Reviews. vol. 3, pp. 001-007. Feb. 2008.*
Bally, T.; Chai, S.; Neuenschwander, M.; Zhu, Z. Pentalene: Formation, Electronic, and Vibrational Structure. Journal of the American Chemical Society. 1997, vol. 119, pp. 1869-1875.*
Katz, T. J.; Rosenberger, M. The Pentalenyl Dianion. Journal of the American Chemical Society. 1962, vol. 84, pp. 865-866.*
Office Action mailed Dec. 21, 2012 in U.S. Appl. No. 13/157,568.
International Search Report issued in International Patent Application No. PCT/JP2010/058558 on Jul. 20, 2010.
Office Action issued in U.S. Appl. No. 13/157,568 on May 25, 2012.
Office Action issued in U.S. Appl. No. 13/157,568 on Nov. 8, 2012.
Office Action issued on Sep. 25, 2013 in U.S. Appl. No. 13/628,989.

(Continued)

*Primary Examiner* — Robert C Boyle
*Assistant Examiner* — Stephen Rieth
(74) *Attorney, Agent, or Firm* — Knobbe Martens Olson & Bear LLP

(57) ABSTRACT

An adhesive composition of this invention includes a hydrocarbon resin and a solvent for dissolving the hydrocarbon resin, the solvent containing a condensed polycyclic hydrocarbon. Thus, an adhesive composition having excellent product stability is provided.

10 Claims, No Drawings

(56) References Cited

OTHER PUBLICATIONS

Advisory Action issued on Jun. 18, 2013 for U.S. Appl. No. 13/157,568.
Office Action issued on Apr. 10, 2013 in U.S. Appl. No. 13/157,568.
Office Action cited in corresponding Japanese Patent Application No. 2010-136465 on Feb. 25, 2014.
Japanese Office Action dated Jun. 10, 2014 for JP Application No. 2011-004959.
Office Action in Japanese Patent Application No. 2012-062145, dated Jul. 15, 2014.
Office Action in U.S. Appl. No. 13/157,568, mailed Aug. 14, 2014.
Wallow et al., "Low-distortion, high-strength bonding of thermoplastic microfluidic devices employing case-II diffusion mediated permeant activation", Sep. 19, 2007.

* cited by examiner

ADHESIVE COMPOSITION

RELATED APPLICATIONS

This application claims priority under 35 U.S.C. §119(a)-(d) to Japanese Patent Application No. 2010-220763, filed on Sep. 30, 2010, and Japanese Patent Application No. 2011-004959, filed on Jan. 13, 2011, the entire contents of which are incorporated herein by reference.

TECHNICAL FIELD

The present invention relates to an adhesive composition, for example, an adhesive composition for use in a manufacturing process for processing a substrate such as a semiconductor wafer.

BACKGROUND ART

Devices such as mobile phones, digital AV devices, and IC cards have been developed to have higher functions. Along with this, there are increasing needs for a smaller and thinner semiconductor silicon chip (hereinafter, referred to as a "chip") mounted in such a device, in order to provide a greater number of chips in a package. For example, an integrated circuit including a plurality of chips in a single package, representative examples of which include CSP (chip size package) and MCP (multi-chip package), is requested to be made thinner. In order to provide a greater number of chips in a package, a thickness of a chip needs to be reduced to a range from 25 μm to 150 μm.

However, if a semiconductor wafer (hereinafter, referred to as a "wafer"), which serves as a base of the chip, is ground, a thickness of the wafer is reduced. This reduces the strength of the wafer, thereby easily causing a crack or warpage of the wafer. Further, it is difficult to automatically convey the wafer whose strength has been reduced due to the reduction in the thickness. Therefore, such a wafer must be conveyed by a human's hands. Thus, it is troublesome to handle such a wafer.

In order to address this problem, there has been developed a wafer handling system for preventing occurrence of a crack and warpage of a wafer by maintaining a strength of the wafer through use of a plate (called as a "support plate") which is made from glass, a rigid plastic, or the like and is bonded to the wafer to be ground. With the wafer handling system, it is possible to maintain the strength of a wafer, thereby making it possible to automatically convey a semiconductor wafer which has been made thinner.

According to the wafer handling system, a wafer and a support plate are bonded to each other via an adhesive tape, a thermoplastic resin, an adhesive, or the like. Then, the wafer to which the support plate is bonded is made thinner, and then the support plate is stripped from the substrate before the wafer is diced. In a case where the wafer and the support plate are bonded to each other via an adhesive, the adhesive is dissolved so that the support plate is stripped from the wafer.

Patent Literature 1 describes an adhesive resin composition containing a polymer having an alicyclic structure.

CITATION LIST

Patent Literature 1
Japanese Patent Application Publication, Tokukaihei, No. 11-269394 A (Publication Date: Oct. 5, 1999)

SUMMARY OF THE INVENTION

Technical Problem

However, the above technique has the following problem. In a case where an adhesive composition is preserved in the form of a liquid, some types of resins contained in the adhesive composition cause white turbidity as time advances. This problem is notable especially in a case where the adhesive composition is preserved at a low temperature.

In view of this, there is a demand for development of an adhesive composition having more excellent product stability.

The present invention was made in view of the foregoing problems, and an object of the present invention is to provide an adhesive composition having excellent product stability.

Solution to Problem

An adhesive composition of the present invention includes a hydrocarbon resin and a solvent for dissolving the hydrocarbon resin, the solvent containing a condensed polycyclic hydrocarbon.

Advantageous Effects of Invention

According to the present invention, it is possible to provide an adhesive composition having excellent product stability.

Additional objects, features, and strengths of the present invention will be made clear by the description below.

DESCRIPTION OF EMBODIMENTS

An adhesive composition of the present invention includes a hydrocarbon resin and a solvent for dissolving the hydrocarbon resin, the solvent containing a condensed polycyclic hydrocarbon.

Use of the adhesive composition of the present invention is not particularly limited. For example, the adhesive composition of the present invention can be used in a manufacturing process of a semiconductor wafer (hereinafter, referred to as a "wafer"). Particularly, the adhesive composition of the present invention can suitably be used to temporarily adhere the wafer to a supporting plate (hereinafter, referred to as a "support plate") in order to prevent breakage and staining of the wafer which has been made thinner.

Hydrocarbon Resin

The hydrocarbon resin is a resin having a hydrocarbon skeleton, and is obtained by polymerization of monomer components. The hydrocarbon resin is, for example, a cycloolefin polymer (hereinafter, also referred to as a "resin (A)") or at least one kind of resin (hereinafter, also referred to as "resin (B)") selected from the group consisting of terpene resins, rosin resins, and petroleum resins.

The cycloolefin polymer is a resin obtained by polymerization of cycloolefin monomers, which are monomer components. Examples of the cycloolefin monomer encompass bicyclic compounds such as norbornene and norbornadiene; tricyclic compounds such as dicyclopentadiene and dihydroxypentadiene; tetracyclic compounds such as tetracyclododecene; pentacyclic compounds such as cyclopentadiene trimer; heptacyclic compounds such as tetracyclopentadiene; alkyl (e.g., methyl, ethyl, propyl, butyl)-substituted compounds of these polycyclic compounds; alkenyl (e.g., vinyl)-substituted compounds of these polycyclic compounds; alkylidene (e.g., ethylidene)-substituted compounds of these polycyclic compounds; and aryl (e.g., phenyl, tolyl, naphthyl)-substituted compounds of these polycyclic compounds. The resin (A) may be (i) the one obtained by polymerization of one kind of cycloolefin monomer selected from these cycloolefin monomers or (ii) the one obtained by polymerization of two or more kinds of cycloolefin monomers selected from these cycloolefin monomers.

Further, the monomer component contained in the resin (A) is not limited to the cycloolefin monomer. The resin (A) may contain another monomer which is polymerizable with the cycloolefin monomer. The another monomer may be, for example, a straight-chain or branched-chain alken monomer. Examples of such an alken monomer encompass α-olefin such as ethylene, propylene, 1-butene, isobutene, and 1-hexene. Either one kind of alken monomer or a combination of two or more kinds of alken monomers may be used.

A molecular weight of the resin (A) is not particularly limited. For example, a weight-average molecular weight (Mw) of the resin (A) measured by gel permeation chromatography (GPC) as a polystyrene corresponding value is in a range from 50,000 to 200,000, and more preferably in a range from 50,000 to 150,000. if the weight-average molecular weight of the resin (A) is within this range, a crack hardly occurs in the wafer after a film of the adhesive composition is formed, and the adhesive composition can attain solubility in a specific solvent.

Further, the resin (A) includes the monomer components whose 5 mol % or more is preferably the cycloolefin monomer in order to attain high heat resistance (low thermal decomposition and low thermal weight reduction properties). More preferably, 10 mol % or more of the monomer components contained in the resin (A) is the cycloolefin monomer. Further more preferably, 20 mol % or more of the monomer components contained in the resin (A) is the cycloolefin monomer. An upper limit of the amount of the cycloolefin monomer in the monomer components in the resin (A) is not particularly limited. However, the amount of the cycloolefin monomer in the monomer components in the resin (A) is preferably 80 mol % or less in terms of the adhesive composition's solubility and temporal stability in the solution, and more preferably 70 mol % or less. In a case where the resin (A) contains a straight-chain or branched-chain alken monomer as another monomer, an amount of the straight-chain or branched-chain alken monomer with respect to a total amount of the monomer components contained in the resin (A) is preferably in a range from 10 mol % to 90 mol % in terms of the adhesive composition's solubility and flexibility, more preferably in a range from 20 mol % to 85 mol %, and particularly preferably in a range from 30 mol % to 80 mol %.

A method and a condition for polymerization of the monomer components are not particularly limited. The monomer components may be polymerized by a well-known conventional method.

A commercially-available product usable as the resin (A) is, for example, "APEL (product name)" manufactured by Mitsui Chemicals, Inc., "TOPAS (product name)" manufactured by Polyplastics Co., Ltd., "ZEONOR (product name)" manufactured by Zeon Corporation, "ZEONEX (product name)" manufactured by Zeon Corporation, or "ARTON (product name)" manufactured by JSR Corporation.

As described above, the resin (B) is at least one kind of resin selected from the group consisting of terpene resins, rosin resins, and petroleum resins. Examples of the terpene resin encompass a terpene resin, a terpene phenol resin, a modified terpene resin, a hydrogenated terpene resin, and a hydrogenated terpene phenol resin. Examples of the rosin resin encompass rosin, rosin ester, hydrogenated rosin, hydrogenated rosin ester, polymerized rosin, polymerized rosin ester, and modified rosin. Examples of the petroleum resin encompass an aliphatic or aromatic petroleum resin, a hydrogenated petroleum resin, a modified petroleum resin, an alicyclic petroleum resin, and a coumarone-indene petroleum resin. Among these, the hydrogenated terpene resin and/or the hydrogenated terpene phenol resin is particularly preferable.

A molecular weight of the resin (B) is not particularly limited. For example, a weight-average molecular weight (Mw) of the resin (B) measured by GPC as a polystyrene corresponding value is in a range from 300 to 10,000, and more preferably in a range from 500 to 5,000. If the weight-average molecular weight of the resin (B) is within this range, a crack hardly occurs in the wafer after a film of the adhesive composition is formed, and the adhesive composition can attain high heat resistance (resistance against thermal decomposition and sublimation).

The resin (A) and the resin (B) may be mixed for use. In such a case, an amount of the resin (A) is preferably 40 parts by weight or more, more preferably 60 parts by weight or more, with respect to a total amount of hydrocarbon resin. In the case where the amount of the resin (A) is 40 parts by weight or more with respect to the total amount of hydrocarbon resin, the adhesive composition can exhibit flexibility and high heat resistance (low thermal decomposition).

Solvent

The solvent dissolves the hydrocarbon resin, and contains a condensed polycyclic hydrocarbon.

The condensed polycyclic hydrocarbon is a condensed ring hydrocarbon in which only one of each of two or more monocyclic compounds is provided for condensation. In the present invention, the condensed polycyclic hydrocarbon is preferably a hydrocarbon obtained by condensation of two monocyclic compounds.

Such a hydrocarbon is, for example, (i) a combination of a five-membered ring compound and a six-membered ring compound or (ii) a combination of two six-membered ring compounds. Examples of the hydrocarbon obtained by the combination of the five-membered ring compound and the six-membered ring compound encompass indene, pentalene, indane, and tetrahydroindene. Examples of the hydrocarbon obtained by the combination of the two six-membered ring compounds encompass naphthalene, tetrahydronaphthalene (tetralin), and decahydronaphthalene (decalin).

A component contained in the solvent may be only the condensed polycyclic hydrocarbon. Alternatively, the solvent may contain another component such as a saturated aliphatic hydrocarbon. In such a case, an amount of the condensed polycyclic hydrocarbon is preferably 40 parts by weight or more, more preferably 60 parts by weight or more, with respect to a total amount of a hydrocarbon solvent. If the amount of the condensed polycyclic hydrocarbon is 40 parts by weight or more with respect to the total amount of hydrocarbon solvent, the solvent can exhibit high performance for dissolving of the resin. If a condensed polycyclic hydrocarbon and a saturated aliphatic hydrocarbon are mixed in a range within this range, it is possible to reduce odor of the condensed polycyclic hydrocarbon.

Examples of the saturated aliphatic hydrocarbon encompass straight-chain hydrocarbons such as hexane, heptane, octane, nonane, methyl octane, decane, undecane, dodecane, and tridecane; branched C3 to C15 hydrocarbons; p-menthane; o-menthane; m-menthane; diphenylmenthane; 1,4-terpin; 1,8-terpin; bornan; norbornan; pinane; thujane; carane; and longifolene.

An amount of the solvent in the adhesive composition of the present invention may be suitably adjusted according to a thickness of an adhesive layer to be formed. For example, the amount of the solvent in the adhesive composition of the present invention is preferably 100 parts by weight or more and not more than 2,000 parts by weight, where an amount of the hydrocarbon resin is 100 parts by weight. If the amount of the solvent is within this range, it is possible to easily adjust viscosity of the adhesive composition.

Thermal Polymerization Inhibitor

The adhesive composition of the present invention may contain a thermal polymerization inhibitor. The thermal polymerization inhibitor inhibits a radical polymerization reaction caused by heat. Specifically, the thermal polymerization inhibitor, which exhibits high reactivity with respect to radical, reacts with the radical preferentially before monomers reacts with the radical, so as to inhibit polymerization of the monomers. The adhesive composition containing such a thermal polymerization inhibitor inhibits' a polymerization reaction at a high temperature (particularly, at a temperature in a range from 250° C. to 350° C.).

For example, a semiconductor manufacturing process includes a high-temperature treatment for heating, at 250° C. for an hour, a wafer to which a support plate is bonded. In this treatment, if polymerization of an adhesive composition occurs due to a high temperature, solubility of the adhesive composition in a stripping solution which is used to strip the support plate from the wafer is reduced after the high-temperature treatment, and therefore it is impossible to favorably strip the support plate from the wafer. However, with the adhesive composition of the present invention containing the thermal polymerization inhibitor, oxidization caused by heat and a polymerization reaction occurring due to the oxidization are inhibited. Therefore, with the adhesive composition of the present invention containing the thermal polymerization inhibitor, even after the high-temperature treatment, it is possible to easily strip a support plate from a wafer, thereby preventing remaining of residuals.

The thermal polymerization inhibitor is not limited to any particular kind, as long as it is effective to prevent a radical polymerization reaction caused by heat. Preferably, the thermal polymerization inhibitor is the one containing phenol. This allows the adhesive component to secure favorable solubility even after the adhesive component is subjected to a high-temperature treatment under atmosphere. Such a thermal polymerization inhibitor can be a hindered phenol antioxidant, examples of which encompass pyrogallol; benzoquinone; hydroquinone; methylene blue; tert-butylcatechol; monobenzyl ether; methylhydroquinone; amyl quinone; amyloxy hydroquinone; n-butyl phenol; phenol; hydroxynone monopropyl ether; 4,4'-(1-methyl ethylidene)bis(2-methyl phenol); 4,4'-(1-methyl ethylidene)bis(2,6-dimethyl phenol); 4,4'-[1-{4-(1-(4-hydroxyphenyl)-1-methyl ethyl)phenyl}ethylidene]bisphenol; 4,4',4"-ethylidenetris(2-methyl phenol); 4,4',4"-ethylidenetrisphenol; 1,1,3-tris(2,5-dimethyl-4-hydroxyphenyl)-3-phenylpropane; 2,6-di-tert-butyl-4-methyl phenol; 2,2'-methylenebis(4-methyl-6-tert-butyl phenol); 4,4'-butylidenebis(3-methyl-6-tert-butyl phenol); 4,4'-thiobis(3-methyl-6-tert-butyl phenol); 3,9-bis[2-(3-(3-tert-butyl-4-hydroxy-5-methylphenyl)-propionyloxy)-1,1-dimethylethyl]-2,4,8,10-tetraoxaspiro(5,5)undecane; triethylene glycol-bis-3-(3-tert-butyl-4-hydroxy-5-methylphenyl)propionate; n-octyl-3-(3,5-di-tert-butyl-4-hydroxyphenyl)propionate; pentaerythryl tetrakis[3-(3,5-di-tert-butyl-4-hydroxyphenyl)propionate] (product name: IRGANOX 1010, manufactured by Ciba Inc.); tris(3,5-di-tert-butyl hydroxy benzil)isocyanurate; and thiodiethylenebis[3-(3,5-di-tert-butyl-4-hydroxyphenyl)propionate].

Either one kind of thermal polymerization inhibitor or a combination of two or more kinds of thermal polymerization inhibitors may be used.

An amount of the thermal polymerization inhibitor may be suitably determined according to (i) a kind of the hydrocarbon resin and (ii) a purpose and use environment of the adhesive composition. For example, the amount of the thermal polymerization inhibitor is 0.1 parts by weight or more and not more than 10 parts by weight, where an amount of the hydrocarbon resin is 100 parts by weight. If the amount of the thermal polymerization inhibitor is within this range, the thermal polymerization inhibitor favorably exhibits the effect of preventing thermal polymerization, thereby enabling to further prevent a reduction in solubility of the adhesive composition in the stripping solution after a high-temperature treatment.

Further, the adhesive composition of the present invention may contain an additional solvent having a different formulation from that of the solvent for dissolving the hydrocarbon resin, the additional solvent dissolving the thermal polymerization inhibitor. Such an additional solvent is not limited to any particular kind, and may be an organic solvent which dissolves components contained in the adhesive composition.

For example, such an organic solvent only needs to dissolve each component in the adhesive composition so as to obtain a uniform solution. One kind of such an organic solvent or a combination of two or more kinds of such organic solvents may be arbitrarily selected for use.

Specifically, the organic solvent may be a terpene solvent having, as a polar group, an oxygen atom, a carbonyl group, an acetoxy group, or the like. Such an organic solvent is, for example, geraniol, nerol, linalool, citral, citronellol, menthol, isomenthol, neomenthol, α-terpineol, β-terpineol, γ-terpineol, terpinene-1-ol, terpinene-4-ol, dihydroterpinyl acetate, 1,4-cineole, 1,8-cineole, borneol, carvone, ionone, thujone, or camphor. Further, other examples of such an organic solvent encompass lactones such as γ-butyrolactone; ketones such as acetone, methyl ethyl ketone, cyclohexanone (CH), methyl-n-pentyl ketone, methyl isopentyl ketone, and 2-heptanone; polyalcohols such as ethylene glycol, diethylene glycol, propylene glycol, and dipropylene glycol; compounds including an ester bond such as ethylene glycol monoacetate, diethylene glycol monoacetate, propylene glycol monoacetate, and dipropylene glycol monoacetate, and derivatives of polyalcohols of compounds including an ether bond such as monophenyl ethers and monoalkyl ethers of the polyalcohols and the compounds including an ester bond such as monomethyl ether, monoethyl ether, monopropyl ether, and monobutyl ether (among these, propylene glycol monomethyl ether acetate (PGMEA) or propylene glycol monomethyl ether (PGME) is preferable); cyclic ethers such as dioxane and esters such as methyl lactate, ethyl lactate (EL), methyl acetate, ethyl acetate, butyl acetate, methyl pyruvate, ethyl pyruvate, methyl methoxypropionate, and ethyl ethoxypropionate; aromatic organic solvents such as anisole, ethyl benzyl ether, cresyl methyl ether, diphenyl ether, dibenzyl ether, phenetol, butyl phenyl ether.

An amount of the additional solvent may be suitably determined according to a type, etc. of the thermal polymerization inhibitor. For example, the amount of the additional solvent is preferably 1 part by weight or more and not more than 50 parts by weight, more preferably 1 part by weight to 30 parts by weight, and most preferably 1 part by weight to 15 parts by weight, where an amount of the thermal polymerization inhibitor is 1 parts by weight. If the amount of the additional solvent is within this range, the additional solvent can sufficiently dissolve the thermal polymerization inhibitor.

Other Components

The adhesive composition may further contain other substance(s) miscible therein, in a range which does not impair essential characteristics of the present invention. For example, the adhesive composition can further contain any of generally-used various kinds of additives such as an additional resin, a plasticizer, an adhesive auxiliary substance, a stabilizer, a colorant, and a surfactant, each of which is used to improve performance of the adhesive.

The embodiments of the present invention are described in further detail via the following Examples. Needless to say, the present invention is not limited to these Examples. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. Furthermore, all the documents described herein are incorporated by reference.

EXAMPLES

Preparation of Adhesive Composition

Adhesive compositions having the formulations shown in Tables 1 and 2 were prepared.

Used as the hydrocarbon resin were (i) "APEL (product name) 8008T COC, Mw=100,000, Mw/Mn=2.1, m:n=80:20 (molar ratio)" (hereinafter, referred to as "COC1"), (ii) "APEL (product name) 8009T COC, Mw=120,000, Mw/Mn=2.2, m:n=75:25 (molar ratio)" (hereinafter, referred to as "COC2"), and (iii) "APEL (product name) 6013T COC, Mw=80,000, Mw/Mn=2.0, m:n=52:48 (molar ratio)" (hereinafter, referred to as "COC3"). Each of these hydrocarbon resins are manufactured by Mitsui Chemicals; Inc., and are shown in the following Formula (I).

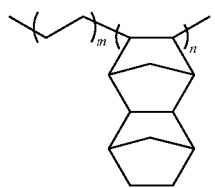

(I)

Used as the thermal polymerization inhibitor was "IRGANOX (product name) 1010" manufactured by Ciba Inc. Used as the solvent were tetrahydro naphthalene manufactured by Nacalai Tesque, Inc., decahydro naphthalene manufactured by Nacalai Tesque, Inc., p-menthane manufactured by Yasuhara Chemical Co., Ltd., and limonene manufactured by Yasuhara Chemical Co., Ltd. Used as the additional solvent was dihydroterpinyl acetate manufactured by Nippon Terpene Chemicals, Inc.

Examples 1 through 6

In each of Examples 1 through 6, the hydrocarbon resin shown in Table 1 was dissolved in the solvent, and the resultant was mixed with the thermal polymerization inhibitor dissolved in the additional solvent so as to prepare an adhesive composition. Then, the adhesive composition was evaluated in terms of product stability. In Table 1, the unit of values in parentheses is "parts by weight".

TABLE 1

|  | Example 1 | Example 2 | Example 3 | Example 4 | Example 5 | Example 6 |
| --- | --- | --- | --- | --- | --- | --- |
| Hydrocarbon resin | COC1 (100) | COC1 (100) | COC1 (100) | COC1 (100) | COC2 (100) | COC3 (100) |
| Solvent | Tetrahydro naphthalene (250) | p-menthane (125) Tetrahydro naphthalene (125) | Decahydro naphthalene (250) | p-menthane (125) Decahydro naphthalene (125) | Tetrahydro naphthalene (250) | Tetrahydro naphthalene (250) |
| Thermal polymerization inhibitor | IRGANOX 1010 (5) | IRGANOX 1010 (5) | IRGANOX 1010 (5) | IRGANOX 1010 (5) | IRGANOX 1010 (5) | IRGANOX 1010 (5) |
| Additional solvent | Dihydroterpinyl acetate (45) | Dihydroterpinyl acetate (45) | Dihydroterpinyl acetate (45) | Dihydroterpinyl acetate (45) | Dihydroterpinyl acetate (45) | Dihydroterpinyl acetate (45) |
| Product stability (Appearance after being left at 5° C. for one month) | Good | Good | Good | Good | Good | Good |

Evaluation of Product Stability

The evaluation of product stability was carried out as follows. The adhesive compositions prepared in respective Examples were stored in containers, and were left at 5° C. for one month. Then, observation was carried out in order to check for white turbidity caused by the hydrocarbon resin separated out.

A criterion for the evaluation was a turbidity calculated based on a total light transmittance measured by UV spectrophotometer UV3600 (Shimadzu Corporation). A turbidity of less than 10 was evaluated as "good", and a turbidity of 10 or more was evaluated as "poor". The results show that all the adhesive compositions prepared in Examples 1 through 6 were free from white turbidity, and had excellent product stability even after one month.

Comparative Examples 1 through 3

In Comparative Examples 1 through 3, adhesive compositions having the formulations shown in Table 2 were prepared by the same method as in Examples 1 through 6. Then, the adhesive compositions thus prepared were evaluated in terms of product stability.

TABLE 2

|  | C. Example 1* | C. Example 2* | C. Example 3* |
| --- | --- | --- | --- |
| Hydrocarbon resin | COC1 (100) | COC2 (100) | COC3 (100) |
| Solvent | p-menthane | Limonene | Dihydro- |

TABLE 2-continued

|  | C. Example 1* | C. Example 2* | C. Example 3* |
|---|---|---|---|
|  | (250) | (250) | terpinyl acetate (250) |
| Thermal polymerization inhibitor | IRGANOX 1010 (5) | IRGANOX 1010 (5) | IRGANOX 1010 (5) |
| Additional solvent | Dihydro-terpinyl acetate (45) | Dihydro-terpinyl acetate (45) | Dihydro-terpinyl acetate (45) |
| Product stability (Appearance after being left at 5° C. for one month) | Poor | Poor | Poor |

*"C. Example" stands for "Comparative Example".

As shown in Table 2, Comparative Example 1 used p-menthane as the solvent, and Comparative Example 2 used limonene as the solvent. Comparative Example 3 used dihydroterpinyl acetate as the solvent, which dihydroterpinyl acetate was also used as the additional solvent. Thus, the adhesive compositions of respective Comparative Examples used the solvent containing no condensed polycyclic hydrocarbon. As a result, white turbidities were observed in all the adhesive compositions after one month.

Examples 7 through 9

Examples 7 through 9 used hydrocarbon resins different from those used in the adhesive compositions of Examples 1 through 6 and Comparative Examples 1 through 3. Specifically, Examples 7 through 9 used, as the hydrocarbon resins, a cycloolefin copolymer ("TOPAS (product name) 8007X10" manufactured by Polyplastics Co., Ltd.) alone, which is prepared by copolymerization of norbornene and ethylene via a metallocene catalyst.

As the cycloolefin copolymer, the following three types were prepared: COC A (Mw=95,000, Mw/Mn=1.9) including, in a ratio of x:y=35:65, a repeating unit of ethylene shown in Formula (II) and a repeating unit of norbornene shown in Formula (III); COC B (Mw=70,000, Mw/Mn=1.6) including these repeating units in a ratio of x:y 24:76; and COC C (Mw=60,000, Mw/Mn=1.5) including these repeating units in a ratio of x:y=20:80.

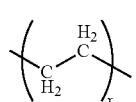

(II)

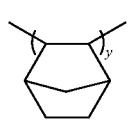

(III)

Further, each of Examples 7 through 9 used tetrahydro naphthalene (manufactured by Nacalai Tesque, Inc.) as the solvent. Furthermore, each of Examples 7 through 9 used, as the thermal polymerization inhibitor and the additional solvent, the same compounds as those used in Examples 1 through 6.

In Examples 7 through 9, these materials were combined as shown in Table 3 so as to prepare adhesive compositions. Then, the adhesive compositions thus prepared were evaluated in terms of stripping properties and product stability in the same manner as in Examples 1 through 6. The unit of values in parentheses is "parts by weight".

TABLE 3

|  | Example 7 | Example 8 | Example 9 |
|---|---|---|---|
| Hydrocarbon resin | COC A (100) | COC B (100) | COC C (100) |
| Solvent | Tetrahydro naphthalene (250) | Tetrahydro naphthalene (250) | Tetrahydro naphthalene (250) |
| Thermal polymerization inhibitor | IRGANOX 1010 (5) | IRGANOX 1010 (5) | IRGANOX 1010 (5) |
| Additional solvent | Dihydro-terpinyl acetate (45) | Dihydro-terpinyl acetate (45) | Dihydro-terpinyl acetate (45) |
| Product stability (Appearance after being left at 5° C. for one month) | Good | Good | Good |

The evaluation of product stability was carried out as follows in the same manner as in Examples 1 through 6. The adhesive compositions prepared in respective Examples were stored in containers, and were left at 5° C. for one month. Then, observation was carried out in order to check for white turbidity caused by the hydrocarbon resin separated out. As a result, although COC A, COC B, and COC C, respectively used in Examples 7 through 9, are polymers originally having white turbidity, the adhesive compositions of Examples 7 through 9 had further increased transparency, and had excellent product stability even after one month.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An adhesive composition of the present invention is suitably applicable in, e.g., a process for manufacturing a small semiconductor device.

What is claimed is:

1. An adhesive composition comprising:
   a hydrocarbon resin;
   a first solvent for dissolving the hydrocarbon resin, wherein the first solvent is at least one selected from the group consisting of indene, indane, tetrahydroindene, naphthalene, tetrahydronaphthalene, and decahydronaphthalene (decalin);
   a thermal polymerization inhibitor; and
   a second solvent for dissolving the thermal polymerization inhibitor, wherein the second solvent is different than the first solvent, and wherein the second solvent is dihydroterpinyl acetate.

2. The adhesive composition of claim 1, wherein an amount of the first solvent is 100 parts by weight or more and not more than 2000 parts by weight, wherein an amount of the hydrocarbon resin is 100 parts by weight.

3. The adhesive composition of claim 1, wherein the hydrocarbon resin is a cycloolefin polymer.

4. The adhesive composition of claim 1, wherein the thermal polymerization inhibitor is a phenol thermal polymerization inhibitor.

5. The adhesive composition of claim 1, wherein the first solvent is selected from the group consisting of tetrahydronaphthalene and decahydronaphthalene (decalin).

6. An adhesive composition comprising:
a hydrocarbon resin;
a first solvent for dissolving the hydrocarbon resin, wherein the first solvent is at least one selected from the group consisting of indene, indane, tetrahydroindene, naphthalene, tetrahydronaphthalene, and decahydronaphthalene (decalin);
a thermal polymerization inhibitor; and
a second solvent for dissolving the thermal polymerization inhibitor, wherein the second solvent is different than the first solvent, and wherein the second solvent is selected from the group consisting of butyl acetate, propylene glycol monomethyl ether acetate (PGMEA), and dihydroterpinyl acetate,
wherein the hydrocarbon resin is a cycloolefin polymer.

7. The adhesive composition of claim 6, wherein an amount of the first solvent is 100 parts by weight or more and not more than 2000 parts by weight, and an amount of the hydrocarbon resin is 100 parts by weight.

8. The adhesive composition of claim 6, wherein the thermal polymerization inhibitor is a phenol thermal polymerization inhibitor.

9. The adhesive composition of claim 6, wherein the second solvent is dihydroterpinyl acetate.

10. The adhesive composition of claim 6, wherein the first solvent is selected from the group consisting of tetrahydronaphthalene and decahydronaphthalene (decalin).

* * * * *